United States Patent [19]

Wolters

[11] 4,099,725

[45] Jul. 11, 1978

[54] SEAL OF THE UPPER AREA OF A WET CYLINDER LINER

[75] Inventor: Gerhard Wolters, Gaggenau, Fed. Rep. of Germany

[73] Assignee: Daimler-Benz Aktiengesellschaft, Fed. Rep. of Germany

[21] Appl. No.: 809,403

[22] Filed: Jun. 23, 1977

[30] Foreign Application Priority Data

Jun. 25, 1976 [DE] Fed. Rep. of Germany ....... 2628674

[51] Int. Cl.[2] ........................... F02F 1/24; F16J 15/14

[52] U.S. Cl. ........................................ 277/1; 277/117; 92/171; 123/193 CH

[58] Field of Search ...................... 277/1, 117; 92/169, 92/171; 123/193 C, 193 CH

[56] References Cited

U.S. PATENT DOCUMENTS 3,853,099 12/1974 Feather et al. ........... 123/193 CH X
3,865,387 2/1975 Larker et al. .................... 277/117 X

FOREIGN PATENT DOCUMENTS 1,186,685 2/1965 Fed. Rep. of Germany ....... 123/193 CH

*Primary Examiner*—Robert S. Ward, Jr.
*Attorney, Agent, or Firm*—Craig & Antonelli

[57] ABSTRACT

A seal of the upper area of a wet cylinder liner with respect to the crankcase of a reciprocating piston internal combustion engine and a method of making the same, whereby a liner collar of the cylinder liner rests with a collar surface on a support surface at the crankcase; a thin layer of silicon rubber or of other deformable sealing material is applied between the collar surface and the support surface either prior to or during the pressing-in operation of the cylinder liner into the crankcase by applying such a quantity of the silicon rubber or deformable sealing material into an annular space formed by a recess in the cylinder liner underneath the liner collar and/or by a chamfer at the crankcase, that toward the end of the pressing-in operation the sealing material is pressed between the collar surface and the support surface and forms thereat a layer.

12 Claims, 1 Drawing Figure

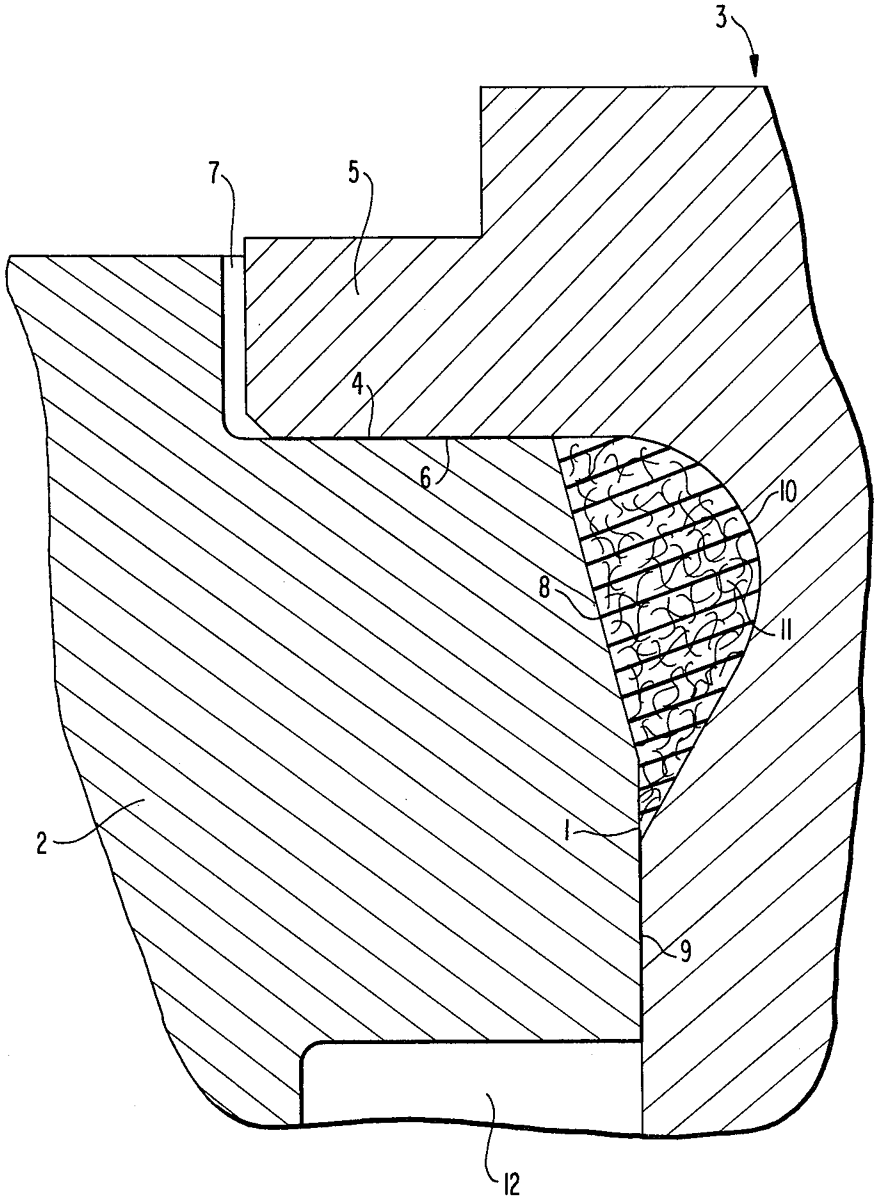
3
7
5
4
6
10
8
11
1
2
9
12

SEAL OF THE UPPER AREA OF A WET CYLINDER LINER

The present invention relates to the seal of the upper area of a wet cylinder liner with respect to the crankcase of a reciprocating piston internal combustion engine, whereby a liner collar of the cylinder contact surface rests with a collar surface on a support surface at the crankcase, with an annular space formed by a recess or groove in the cylinder liner underneath the liner collar and/or by a chamfer or bevel at the crankcase inside of the support surface, in which is disposed a sealing means.

As a consequence of the alternating gas forces in the cylinder, the liner collar carries out axial movements relative to the crankcase, whereby after the grinding-off of unevenesses of the collar surface and of the support surface at the crankcase, the collar surface digs into the crankcase, as a result of which a sinking of the cylinder liner occurs together with its harmful consequences. This sinking is favored by the fact that notwithstanding the seal which consists of a sealing ring, for example, of an O-ring, or of a deformable sealing means, it cannot be avoided altogether that water out of the cooling space reaches between the collar surface and the support surface, leads thereat to corrosion and acts like an abrasive.

The present invention is concerned with the task to provide a seal which at least strongly reduces the sinking-in of the cylinder liner.

The underlying problems are solved according to the present invention in that a thin layer of a silicon rubber or of another deformable sealing material is applied between the collar surface and the support surface at the crankcase.

The thin layer prevents that water can wet the collar surface and the support surface so that these surfaces cannot corrode. The sinking of the cylinder liner is at least considerably reduced therewith.

In an advantageous manner, the layer has such a thickness that only the unevenesses between the collar surface and the support surface are filled out. There then still exist eyelet-shaped metallic contacts between the collar surface and the support surface. These eyelet surfaces, however, will hardly come in contact with the water by reason of the sealing material surrounding the same so that the danger of the corrosion practically no longer exists.

The thickness of the layer may also be so determined that the layer at its thinnest places has a molecular layer thickness. The collar surface and the support surface are then completely covered by the sealing material so that the water no longer finds an attack surface.

An advantageous method for the application of the seal consists in a reciprocating piston internal combustion engine with a recess or groove in the cylinder liner underneath the liner collar and/or with a chamfer or bevel at the crankcase inside of the support surface in that prior to or during the pressing-in of the cylinder liner into the crankcase, silicon rubber or another deformable sealing material is applied in such quantities into the annular space formed by the recess and/or the chamfer that the sealing material is being pressed between the collar surface and the support surface toward the end of the pressing-in operation and forms thereat a layer.

Accordingly, it is an object of the present invention to provide a seal of the upper area of a wet cylinder liner with respect to the crankcase of a reciprocating piston internal combustion engine and a method of making the same, which avoid the aforementioned shortcomings and drawbacks encountered in the prior art by extremely simple means.

Another object of the present invention resides in a seal of the upper area of a wet cylinder liner with respect to the crankcase of a reciprocating piston internal combustion engine and in a method of making the same, which effectively prevent or at least minimize the sinking of the cylinder liner.

Still another object of the present invention resides in a seal of the upper area of a wet cylinder liner and in a method of realizing the same, which prevent corrosion within this area by water stemming from cooling spaces.

A further object of the present invention resides in a seal for the upper area of a wet cylinder liner and in a method for applying the same, which are simple in construction, involve no costly operations and are highly effective to achieve the desired results.

These and further objects, features and advantages of the present invention will become more apparent from the following description when taken in connection with the accompanying drawing which shows, for purposes of illustration only, one embodiment in accordance with the present invention, and wherein:

The single FIGURE is a partial cross-sectional view through the upper area of a wet cylinder liner in a reciprocating piston internal combustion engine according to the present invention.

Referring now to the single FIGURE of the drawing, a wet cylinder liner generally designated by reference numeral 3 is pressed into a cylinder bore 1 of a crankcase 2 of a reciprocating piston internal combustion engine, not illustrated in detail. The cylinder liner 3 rests with a collar surface 4 of a collar 5 on a support surface 6 at the crankcase 2, which forms the bottom of a recess 7. The transition between the support surface 6 and the cylinder bore is provided with a chamfer or bevel 8. A recess or groove 10 forms the transition between the collar surface 4 and the outer cylinder surface 9 of the cylinder liner 3. The chamfer or bevel 8 and the recess or groove 10 form together an annular space 11.

Prior to and/or during the pressing-in operation of the cylinder liner 3, silicon rubber or any other known, suitable deformable sealing material with similar properties is introduced into the annular space 11 and into the recess 7 in larger quantities than the annular space 11 can accommodate in the installed condition of the cylinder liner 3. The excess silicon rubber or deformable sealing material is pressed-out between the collar surface 4 and the support surface 6 and forms between these two surfaces a layer. It is prevented thereby that the cooling water can reach out of the cooling water space 12 the collar surface 4 and the support surface 6 and that the same can corrode.

As mentioned above, the thickness of the layer may be such that only the unevenesses are filled out between the collar surface 4 and the support surface 6, thereby leaving eyelet shaped metallic contacts between the collar surface 4 and the support surface 6. However, the thickness of the layer may also be so determined that the final layer has a layer thickness such that the thickness is only molecular at its thinnest place or places. In that case, the collar surface 4 and the support surface 6 are then completely covered by the sealing material so that no surface remains which can be attacked by the water.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A seal for the upper area of a wet cylinder liner with respect to a crankcase of a reciprocating piston internal combustion engine, in which a liner collar of the cylinder liner rests with a collar surface on a support surface provided at the crankcase, and which includes an annular space formed by at least one of the two parts consisting of a recess in the cylinder liner underneath the liner collar and a chamfer at the crankcase inside of the support surface, a sealing material being disposed in said annular space, characterized in that a thin layer of deformable sealing material is applied between the collar surface and the support surface.

2. A seal according to claim 1, characterized in that the deformable sealing material essentially consists of silicon rubber.

3. A seal according to claim 2, characterized in that the layer has such a thickness that unevenesses between the collar surface and the support surface are filled out.

4. A seal according to claim 2, characterized in that the layer has a molecular layer thickness at its thinnest places.

5. A seal according to claim 1, characterized in that the layer has such a thickness that unevenesses between the collar surface and the support surface are filled out.

6. A seal according to claim 1, characterized in that the layer has a molecular layer thickness at its thinnest places.

7. A method for applying a seal to the upper area of a wet cylinder liner which seals the cylinder liner with respect to the crankcase of a reciprocating piston internal combustion engine, in which a liner collar of the cylinder liner rests with a collar surface on a support surface of the crankcase, and in which an annular space is formed between the cylinder bore and the cylinder liner by at least one of the two parts consisting of a recess in the cylinder liner underneath the liner collar and a chamfer at the crankcase inside of the support surface, comprising the steps of filling the annular space with a deformable sealing material in such quantities that toward the end of the pressing-in operation of the cylinder liner into the cylinder bore, the sealing material is pressed between the collar surface and the support surface and forms thereat a layer.

8. A method according to claim 7, characterized in that the deformable sealing material is applied to the annular space prior to the pressing-in operation of the cylinder liner into the crankcase.

9. A method according to claim 8, characterized in that the sealing material is applied to the annular space during the pressing-in operation of the cylinder liner.

10. A method according to claim 9, characterized in that the sealing material essentially consists of silicon rubber.

11. A method according to claim 7, characterized in that the sealing material is applied to the annular space during the pressing-in operation of the cylinder liner.

12. A method according to claim 7, characterized in that the sealing material essentially consists of silicon rubber.

* * * * *